United States Patent
Garrard et al.

(10) Patent No.: US 10,253,744 B2
(45) Date of Patent: Apr. 9, 2019

(54) FLYBACK SWITCHING MODE POWER SUPPLY WITH VOLTAGE CONTROL AND A METHOD THEREOF

(71) Applicants: Michael Robert Garrard, Jaywick (GB); Anoop K. Aggarwal, Bangalore (IN); Ralph C. Ferrara, Scottsdale, AZ (US)

(72) Inventors: Michael Robert Garrard, Jaywick (GB); Anoop K. Aggarwal, Bangalore (IN); Ralph C. Ferrara, Scottsdale, AZ (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 15/038,263

(22) PCT Filed: Nov. 25, 2013

(86) PCT No.: PCT/IB2013/060375
§ 371 (c)(1),
(2) Date: May 20, 2016

(87) PCT Pub. No.: WO2015/075508
PCT Pub. Date: May 28, 2015

(65) Prior Publication Data
US 2016/0298590 A1    Oct. 13, 2016

(51) Int. Cl.
*F02P 3/09* (2006.01)
*H02M 3/335* (2006.01)
(Continued)

(52) U.S. Cl.
CPC ............... *F02P 3/09* (2013.01); *F02P 3/08* (2013.01); *H02M 3/33515* (2013.01); *H02M 3/33523* (2013.01); *H02M 2001/0009* (2013.01)

(58) Field of Classification Search
CPC .......... F02P 3/08; F02P 3/09; H02M 3/33523; H02M 3/33515; H02M 2001/0009
(Continued)

(56) References Cited

U.S. PATENT DOCUMENTS 4,377,842 A * 3/1983 Cambier ............... H02M 3/335
363/20
7,499,295 B2    3/2009 Indika De Silva et al.
(Continued)

FOREIGN PATENT DOCUMENTS

| | | |
|---|---|---|
| EP | 2312736 A2 | 4/2011 |
| JP | 2012125025 A | 6/2012 |
| WO | 2007072075 A2 | 6/2007 |

OTHER PUBLICATIONS

International Search Report for application No. PCT/IB2013/060375, dated Aug. 22, 2014, 14 pages.

*Primary Examiner* — Seokjin Kim (57) ABSTRACT

A controller used to control a flyback switching mode power supply. The flyback switching mode power supply is constructed to charge a capacitor, and includes a rectifying device, a series arrangement of a switch and a primary winding of a transformer for receiving an input voltage, and a secondary winding of the transformer for charging the capacitor via the rectifying device to an output voltage. The controller is configured to sense the output voltage and to turn on the switch when the change of the output voltage over time becomes smaller than a predetermined threshold. By using the controller to sense and use the output voltage across the capacitor to turn on the switch, a controlled flyback switching mode power supply that makes use of voltage control is realized.

20 Claims, 4 Drawing Sheets

(51) Int. Cl.
*F02P 3/08* (2006.01)
*H02M 1/00* (2006.01)

(58) Field of Classification Search
USPC ................................ 363/21.12, 21.15–21.18
See application file for complete search history.

(56) References Cited

U.S. PATENT DOCUMENTS

| | | |
|---|---|---|
| 7,719,248 B1 | 5/2010 | Melanson |
| 2007/0200510 A1 | 8/2007 | Bastians |
| 2008/0123380 A1 | 5/2008 | Park et al. |
| 2010/0073844 A1* | 3/2010 | Osa .................. F23Q 3/004 361/263 |
| 2013/0141947 A1 | 6/2013 | Sakurai et al. |
| 2013/0208513 A1* | 8/2013 | Germe ................ H02M 1/40 363/21.13 |
| 2014/0268923 A1* | 9/2014 | Valley ............ H02M 3/33523 363/21.17 |
| 2015/0033699 A1* | 2/2015 | Schaeffer ............. F02C 7/266 60/39.827 |

* cited by examiner

FLYBACK SWITCHING MODE POWER SUPPLY WITH VOLTAGE CONTROL AND A METHOD THEREOF

FIELD OF THE INVENTION

This invention relates to a controller for a flyback switching mode power supply, to an integrated circuit including said controller, to a flyback switching mode power supply including any of the said controller or integrated circuit, and to a capacitive discharge ignition system which includes said flyback switching mode power supply. The invention further relates to a method of controlling the flyback switching mode power supply and to a controller and to a computer program product that causes the controller to perform said method.

BACKGROUND OF THE INVENTION

A Capacitive discharge Ignition System (CDI system) is an electronic ignition system which may be used in spark ignition engines of automotive vehicles. The CDI system uses a capacitor discharge current to fire a spark plug used to ignite a mixture of fuel and air in a combustion chamber of the spark ignition engine.

A typical CDI system consists of a Switch Mode Power Supply (SMPS) that may up convert a DC voltage for example generated in a battery of the automotive vehicle into a high voltage required by an ignition coil connected to the spark plug. The DC voltage may be 12 V while the high voltage supplied to the ignition coil of the spark plug may be typically 150-300 V.

In capacitive discharge ignition systems, the Switch Mode Power Supply (SMPS) is typically a flyback SMPS that uses a transformer and a switch at a primary side of the transformer to perform a so called "flyback" action. The flyback action originates from a reversal of a voltage across a secondary winding of the transformer in consequence to an off state of the switch at the primary side of the transformer. Energy accumulated in the transformer at the primary winding during an on state of the switch, it is released by the transformer at the secondary winding during an off state of the switch. The reversal of the voltage induced across the secondary winding, which is a consequence of a sudden collapse of a magnetic flux in the transformer at the primary winding, is large enough to forward bias a rectifying device arranged between the secondary winding and the capacitor. The rectifying device is used to block currents flowing from the capacitor to the secondary winding during an on state of the switch. By forward biasing the rectifying device, a current may flow from the secondary winding to the capacitor, thereby discharging the transformer at the secondary winding and charging the capacitor. Operation of a flyback SMPS in continuous mode can result in very high currents and heat dissipation. The flyback SMPS is thus typically driven in discontinuous conduction mode to allow a complete discharge of the transformer at the secondary winding during the turn off state of the switch. In the discontinuous current mode the current at the secondary winding falls to zero before the switch is turned on again for another cycle. The discontinuous current mode ensures that no DC current is flowing in the transformer and that all energy stored in the transformer during the turn on state of the switch is transferred to the capacitor during the turn off state of the switch.

In literature many types of flyback switching mode power supplies are disclosed that make use of the discontinuous conduction mode.

For example U.S. Pat. No. 7,719,248B1 discloses a switch-mode converter and a method that uses a sensed current to control the switch-mode converter operating in a discontinuous conduction mode. In one embodiment of the U.S. Pat. No. 7,719,248B1, the switch-mode converter may be a flyback switching mode power supply. The solution provided by U.S. Pat. No. 7,719,248B1 includes a switch-mode converter controller, a comparator and a finite state machine. The comparator receives and compares a sensed current at the primary winding of the transformer with a desired peak current. The finite state machine is configured to operate the switch-mode converter in a discontinuous conduction mode. Responsive to comparisons made by the comparator, the finite state machine turns on the switch and observes an on time duration of the switch until the sensed current reaches the peak current.

Patent application US20080123380 discloses an SMPS and a driving method thereof. The SMPS disclosed in US20080123380 includes a first coil of a primary side of a transformer for transforming an input DC voltage, a second coil and a third coil at a secondary side of the transformer to respectively provide the output voltage of the SMPS and a bias voltage for driving a pulse width modulation signal generator. The pulse width modulation signal generator receives a feedback voltage corresponding to a first voltage generated from the second coil, a sense signal corresponding to the current flowing through the switching transistor, and a third voltage corresponding to a second voltage generated from the third coil. The pulse width modulation signal generator controls an on or off time of the switch so that the SMPS may be driven in a discontinuous conduction mode.

One of the disadvantages of the above mentioned solutions is that a current or a combination of a current and voltages need to be sensed by the SMPS controller in order to drive the SMPS in the discontinuous conduction mode. Since the output of the flyback SMPS is inherently a voltage, extra components are de facto needed in either of the two mentioned solutions. The extra needed components add up to an overall cost of the SMPS. Flyback SMPS used in CDI system are extremely sensitive to cost. A small difference in cost in the order of a few cents may be for example a buying decider of components for increasingly cheaper automotive vehicles containing these CDI systems.

A standard SMPS typically feeds an uncharged capacitive load, which electrically is similar to a short circuit, only at the point of switch on. From thereon the standard SMPS typically delivers a fixed voltage supply to a parallel arrangement of the charged capacitive load and a resistive and/or inductive load. In contrast, in a CDI system the capacitor is discharged up to 200 times a second and thus the standard SMPS spends a significant amount of time operating into a 'short circuit'. Accordingly, there is a need to control the SMPS in a manner that diverges from traditional means.

SUMMARY OF THE INVENTION

The present invention provides a controller for a flyback switching mode power supply as claimed in claim 1, an integrated circuit including the controller, a flyback switching mode power supply including the controller or said integrated circuit and a capacitive discharge ignition system including any of the controller or integrated circuit or flyback switching mode power supply. The present invention further provides a method of controlling a flyback switching mode power supply, a controller to perform the method and a computer program product including instructions that cause the controller to perform the method.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

Elements in the figures are illustrated for simplicity and clarity and have not necessarily been drawn to scale. In the Figures, elements which correspond to elements already described may have the same reference numerals.

DETAILED DESCRIPTION OF THE PREFERRED EMBODIMENTS

Figure 1:
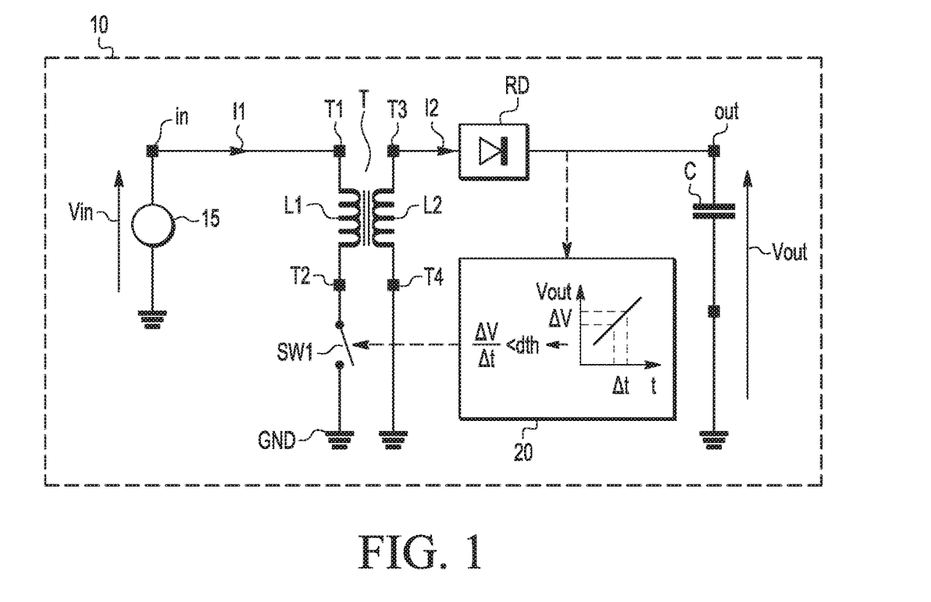
FIG. 1 schematically shows an example of an embodiment of a flyback switching mode power supply, FIG. 2 schematically shows another example of an embodiment of a flyback switching mode power supply, FIG. 3 schematically shows another example of an embodiment of a switching mode power supply, FIG. 4 schematically shows the output voltage and the current at the primary and secondary windings versus time of the flyback switching mode power supply, FIG. 5 schematically shows a flow chart for a method of controlling the flyback switching mode power supply, and FIG. 6 schematically shows another practical flow chart for the method of controlling the flyback switching mode power supply.
Figure 2:
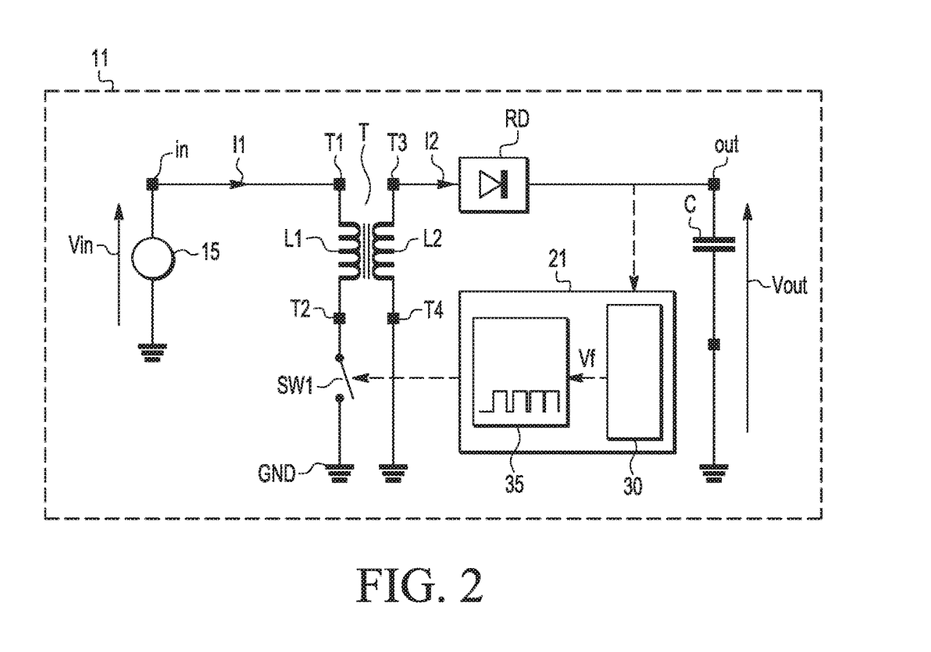
Figure 3:
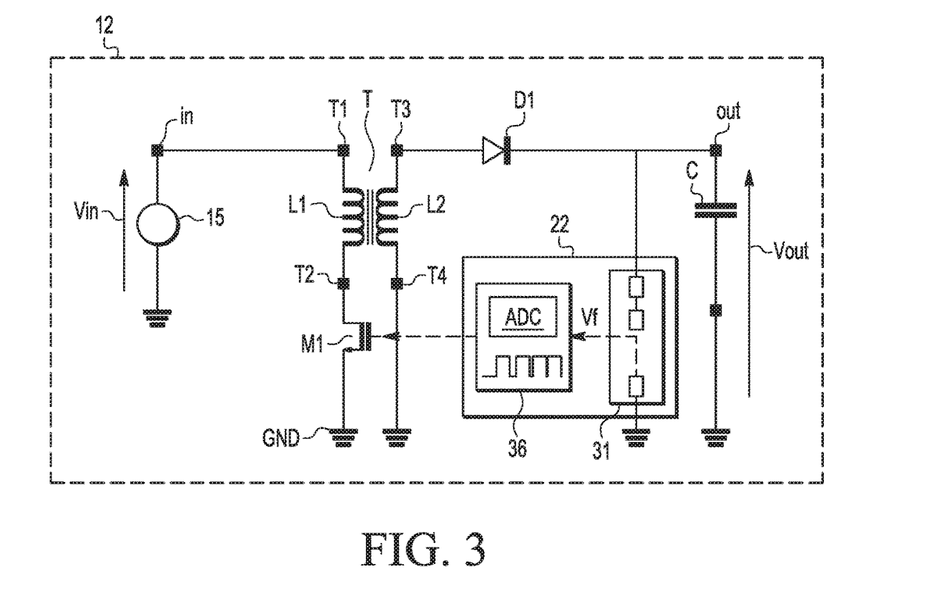

FIG. 1 schematically shows an example of an embodiment of a flyback switching mode power supply 10. The flyback switching mode power supply 10 is constructed to charge a capacitor C, and includes a rectifying device (RD), a series arrangement of a switch SW1 and a primary winding L1 of a transformer T, which series arrangement receives an input voltage Vin. A secondary winding L2 of the transformer T charges the capacitor C via the rectifying device RD to an output voltage Vout. A voltage source 15 may be used to generate the input voltage Vin at an input node in of the flyback switching mode power supply 10. The input voltage Vin may be a DC voltage generated for example by a battery of an automotive vehicle (e.g. the 12 V battery) or it may be a DC output voltage of an AC to DC converter, such as a rectified AC supply. The voltage source 15 may be part of the flyback switching mode power supply 10 or may be external to the flyback switching mode power supply 10. In the examples shown through FIGS. 1 to 3 the voltage source 15 is part of the flyback switching mode power supply 10. The transformer T is used to transform the input voltage Vin into the output voltage Vout at an output node out. The primary winding L1 has a first terminal T1 electrically coupled to the input node in and the secondary winding L2 has a first terminal T3 electrically coupled to the output node out via the rectifier RD. The transformer T may be any type of transformer suitable for the application. The transformer T may for example include a transformer core with primary and secondary windings. The primary winding L1 and the secondary winding L2 may have different turns: for example the secondary winding L2 may have a larger number of turns than the primary winding L1 such that a voltage induced across the secondary winding L2 at the secondary side of the transformer T is larger than a voltage across the primary coil L1 at the primary side of the transformer T. The switch SW1 as shown in FIG. 1 is arranged between the second terminal T2 of the primary winding L1 and a reference potential GND. The reference potential GND may be a ground potential for the flyback switching mode power supply 10 in which case all voltages in the flyback switching mode power supply 10 may be referenced to the same reference potential GND as shown in FIGS. 1 to 3. The ground potential may be typically 0 V. The switch SW1 is used to modulate over time a magnetic flux in the transformer T by switching on and off a magnetizing current I1 flowing from the voltage source 15 to the primary winding L1. A variation of the magnetic flux over time at the primary winding L1 at the primary side of the transformer T induces a voltage across the secondary winding L2 at the secondary side of the transformer T.

When the switch SW1 is turned on, the input voltage Vin generated by the voltage source 15 is applied across the primary winding L1. The input voltage Vin is positive in this example and an increasing magnetizing current I1 flows in the primary winding L1 and the switch SW1. During this phase the magnetic flux is built up only by the magnetizing current I1. The polarity of the secondary winding L2 and of the rectifying device RD is such that no current is flowing at the secondary side of the transformer T. When the switch SW1 is turned off, the magnetizing current I1 at the primary side of the transformer T immediately vanishes. As a consequence the magnetic flux in the transformer T needs also to vanish. For that a demagnetizing current I2 needs to flow at the secondary side of transformer T bringing the rectifying device RD into conduction. This decreasing demagnetizing current I2 flowing through the rectifying device RD charges the capacitor C to an increasing output voltage Vout. A controller 20 is used to sense the output voltage Vout and to turn on the switch SW1 when the first derivative of the output voltage Vout over time becomes smaller than a predetermined threshold dth. The controller 20 may be part of the flyback switching mode power supply 10 or alternatively the controller 20 may be external to the flyback switching mode power supply 10. In FIG. 1 an embodiment in which the controller 20 is part of the flyback switching power supply 10 is shown. The predetermined threshold dth may be chosen to be close or substantially equal to zero. The controller 20 turns on the switch SW1 when an angle of a slope of the output voltage Vout at a point in time (or the tangent line at a point in time) with the time axis is close or substantially equal to zero. Note that the terms "first derivative of the output voltage Vout over time" and "slope"/ "tangent line" output voltage Vout at a point in time should be understood as corresponding to a change of the output voltage Vout over a finite and in particular small time interval at a point in time (of the measurement). As described in detail below with reference to an embodiment or the present invention, a voltage difference is determined from measurements of the output voltage Vout at a time N and a time N+1. The interval of time between the point in time N and in time N+1 may be predefined and constant. The predetermined threshold dth may be defined as a voltage difference or a voltage difference per time unit. Accordingly, the voltage difference of the output voltage Vout determined from the measurements may be compared with the predetermined threshold dth or the voltage difference per time unit, i.e. the voltage difference of the output voltage Vout determined from the measurements in relationship to the time interval between the points in time of measurement N and N+1, may be compared to the predetermined threshold dth.

During a transfer of the energy stored in the transformer T in a previous on state of the switch SW1 to the capacitor C, the output voltage Vout at which the capacitor C is charged will flatten out and the first derivative of the output voltage Vout will decrease. When the first derivative of the output voltage Vout will be close to zero, the transfer of said energy to the capacitor C via the demagnetizing current I2 flowing through the rectifying device RD may be nearly completed. In other words, the controller 20 detects the output voltage Vout, uses the output voltage Vout and compares the first derivative of the output voltage Vout with a predetermined threshold dth to turn on the switch SW1 when the first derivative of the output voltage Vout over time becomes smaller than the predetermined threshold dth. When the predetermined threshold dth is not identical to zero, only part of energy stored in the transformer T (i.e. in the core of the transformer T during a previous on cycle of the switch SW1) is transferred to the capacitor C. When the predetermined threshold dth is identical to zero the total amount of energy stored in transformer T has been transferred to the capacitor C. By using the controller 20 to sense and use the output voltage Vout across the capacitor C to turn on the switch SW1, a controlled flyback switching mode power supply that makes use of voltage control is realized. No additional expensive voltage to current converters are needed to detect a feedback signal used to control the switch SW1. Further to that, the output voltage Vout is the only feedback signal used by the controller 20 to turn on the switch SW1. In the prior art documents cited in the background more than one feedback signal consisting of at least a current is needed to control the switching device in the flyback switching mode power supply. The present solution thus saves costs of implementation with respect to the prior art solutions. Besides that and as earlier explained, the controller 20 is used to control the amount of energy transfer from the transformer T to the capacitor C by sensing the output voltage Vout and comparing the first derivative of the output voltage Vout over time against the predetermined threshold dth. If the predetermined threshold dth is zero, the capacitor C is charged until the demagnetizing current I2 falls to zero, i.e. until the energy previously stored in the transformer T during the on state of the switch SW1 falls to zero. If the predetermined threshold dth is above zero then the demagnetizing current I2 remains above zero, resulting in a greater throughput of power at the expense of higher currents and heat dissipation.

In an embodiment of the flyback switching mode power supply 10, the controller 20 may be configured to turn on the switch SW1 for a fixed duration ton. By turning on the switch SW1 for a fixed duration ton, a fixed amount of energy is stored in the transformer T during a turning on of the switch SW1. This fixed amount of energy is later transferred to the capacitor C after a turning off of the switch SW1. A small fixed duration ton may reduce switching losses in the switch SW1 and consequently reduce heat dissipation in the switch SW1. The duration ton may vary according to the input voltage Vin.

A charging rate of the capacitor C depends upon a pre-existing voltage at the capacitor C. If the capacitor C is initially discharged, i.e. the output voltage Vout at time 0 is 0V, a long time may be required to transfer a given amount of energy stored in the transformer T to the capacitor C. If the capacitor C is already charged to a finite output voltage Vout, a shorter time may be required to transfer the same given amount of energy stored in the transformer T to the capacitor C. The energy once stored in the capacitor C has a quadratic relationship with the voltage across the capacitor C:

$$E(t) = \frac{CV_{out}^2(t)}{2}, \quad (1)$$

Wherein E(t) is the energy stored in the capacitor C at time t and $V_{out}(t)$ is the output voltage Vout at time t across the capacitor C. By explaining the following we refer to FIG. 4 which shows a time diagram of the output voltage Vout, the magnetizing current I1 and the demagnetizing current I2 in a flyback switching mode power supply. If at time $t_0$ the capacitor C is completely discharged, the output voltage Vout at the instant $t_0$ is also zero, i.e. no energy was previously stored in the capacitor C. After instant $t_0$ an amount of energy stored in the transformer T during an on state of the switch SW1 with fixed duration ton is transferred to the capacitor C. This amount of energy transferred from the transformer T to the capacitor C is determined by the output voltage Vout at the instant $t_1$ at which the first derivative of the output voltage Vout becomes smaller than the predetermined threshold dth. At time $t_1$ the switch SW1 is turned on after a time $t_{off1}=t_1-t_0$ has passed. On the contrary at time $t_2$ the capacitor C is already partly charged and the same amount of energy which may be stored in the transformer T during the fixed duration ton, may be transferred to the capacitor C up to an amount defined by the output voltage Vout at time $t_3$ at which the first derivative of the output voltage Vout becomes smaller than the predetermined threshold dth. At time $t_3$ the switch SW1 is again turned on and a time $t_{off2}=t_3-t_2$ smaller than the off time $t_{off1}=t_1-t_0$ of the previous cycle has passed. In this way a cycle by cycle voltage control may be used in which a duration of an on phase of the switch SW1 may be fixed and a duration of an off phase of the switch SW1 may be variable. The switch SW1 may be modulated by the controller 20 with a variable frequency signal. The variable frequency signal may be a so called "chirp" signal with for example increasing frequency over time.

In another example the controller 20 may be further configured to keep the switch SW1 in an off state when the output voltage Vout across the capacitor C has reached a predetermined target voltage Vtarget. The capacitor C may be charged, as previously described, using a cycle by cycle voltage control in which a given amount of energy is transferred in each off cycle of the switch SW1 from the transformer T to the capacitor C. The given amount of energy transferred in each off cycle of the switch SW1 is added to the energy previously stored in the capacitor C in a previous cycle until the predetermined target voltage Vtarget across the capacitor C is reached. Once the predetermined target voltage Vtarget is reached across the capacitor C, the controller 20 may keep the switch SW1 in an off mode thereby halting the control of the flyback switching mode power supply 10. For example, depending on the application, the predetermined target voltage Vtarget may be fixed in a range between 150-300 V. For the capacitive discharge ignition systems (CDI systems) discussed in the background, a value of the predetermined target voltage Vtarget may depend upon a high voltage necessary for an ignition coil that generates the ignition voltage across the spark plug, thereby igniting a mixture of fuel and air in a combustion chamber of a spark ignition engine. The value of the predetermined target voltage Vtarget may be thus chosen in a way such that the flyback switching mode power supply 10 may be suitable to ignite a specific mixture of a specific fuel and air.

The predetermined threshold dth may be chosen in function of how fast the capacitor C may be charged and in function of the heat dissipation capacity of the switch SW1. In a further embodiment the predetermined threshold dth may be less than 0.5 V in 10 us. A predetermined voltage threshold may be less than 1% of the predetermined target voltage Vtarget. In this embodiment the predetermined voltage threshold is chosen to be 0.5 V. A value of the predetermined voltage threshold depends upon how accurately the controller 20 is calibrated.

In another exemplary embodiment, the controller 20 may be configured to connect a load in parallel with the capacitor C in order to discharge the capacitor C after the output voltage Vout has reached the predetermined target voltage Vtarget. The load in parallel with the capacitor C may be the ignition coil used in the above mentioned capacitive discharge ignition systems to transform the predetermined target voltage Vtarget to the thousands of Volts necessary for a spark plug to ignite the mixture of fuel and air. The capacitor C utilized in the flyback switching mode power supply 10 for capacitive discharge ignition systems may be frequently discharged to create ignition sparks. The capacitor C may thus be re-charged after being discharged at a charge rate of up 200 times a second, i.e. every 5 ms, or even at a faster charge rate for higher revving engines or multiple cylinder engines. The controller 20 may thus trigger a connection with the ignition coil every 5 ms or every time the capacitor C has been charged to the predetermined target voltage Vtarget. The ignition coil may work as a pulse transformer rather than a storage medium.

FIG. 2 shows another example of an embodiment of a flyback switching mode power supply 11 according to the invention. The flyback switching mode power supply 11 shown in FIG. 2 is equivalent to the flyback switching mode power supply 10 shown in FIG. 1 except that in FIG. 2 the controller 21 further includes a sensing and a pulse-width modulation unit 35. The sensing device 30 may be used to sense the output voltage Vout and to generate a feedback voltage Vf proportional to the output voltage Vout. The feedback voltage Vf may be a scaled version of the output voltage Vout in a way that the feedback voltage Vf may be kept within a suitable voltage working range of the pulse-width modulation unit 35. The pulse-width modulation unit 35 may be arranged to receive the feedback voltage Vf such that in response to the feedback voltage Vf the pulse-width modulation unit 35 may modulate a duration of the off state of the switch SW1 in the way earlier described. The pulse-width modulation unit 35 may generate a control signal to control the switch SW1 and the control signal may be a "chirp" control signal with variable frequency. The "chirp" control signal may be an "up-chirp" signal in which the frequency of the control signal may increase with time as schematically shown in FIG. 2 in the drawing of the pulse-width modulation unit 35. The pulse-width modulation unit 35 may include a suitable circuit or processing unit (not shown in FIG. 2) that calculates the first derivative of the feedback voltage Vf proportional to the output voltage Vout and compares with the predetermined threshold dth. The circuit or processing unit may cause the pulse-width modulation unit 35 to trigger the switch SW1 to an on state once the first derivative of the feedback voltage Vf proportional to the output voltage Vout becomes smaller than the predetermined threshold dth.

FIG. 3 shows another example of an embodiment of a flyback switching mode power supply 12. The flyback switching mode power supply 12 shown in FIG. 3 is equivalent to the flyback switching mode power supply 11 shown in FIG. 2 except that in FIG. 3 the pulse-width modulation unit 36 of the controller 22 includes an analogue to digital converter ADC, the sensing device 30 of FIG. 2 is replaced in FIG. 3 by a resistor ladder 31 electrically connected in parallel with the capacitor C, the switch SW1 of FIG. 2 is replaced in FIG. 3 by a NMOS transistor M1 and the rectifying device RD of FIG. 2 is replaced in FIG. 3 by a diode D1. The resistor ladder 31 may be used to scale down the output voltage Vout into a feedback voltage Vf proportional to the output voltage Vout. The feedback voltage Vf may for example be in a range of 0-5 V for an output voltage Vout which may be in a range of 0-300 V. The feedback voltage Vf may thus be within the suitable voltage working range of the pulse-width modulation unit 36. The pulse-width modulation unit 36 may be implemented by using low voltage components. The low voltage components of the pulse-width modulation unit 36 may for example be specified in a working voltage range of up to 5 V. The analogue to digital converter ADC may be used in combination with the resistor ladder 31 to monitor the output voltage Vout. The analogue to digital converter ADC may be used to convert the feedback voltage Vf into a correspondent domain digital feedback value. A processor in the pulse-width modulation unit 36 (not shown in FIG. 3) may thus calculate the first derivative of the output voltage Vout and compare said first derivative to the predetermined threshold dth. Analogue to digital conversions performed by the analogue to digital converter ADC may for example be provided at a given sampling frequency at which the output voltage Vout may be sampled. A difference of the output voltage Vout between two subsequent time samples may thus be provided to the processor in the digital domain. The processor then may compare the difference of the output voltage Vout between the two time subsequent time samples with a predetermined threshold voltage. If the difference of the output voltage Vout between the two subsequent time samples is smaller than the predetermined threshold voltage, the pulse-width modulation unit 36 may turn on the NMOS transistor M1. By using the analogue to digital converter ADC most of operations of monitoring the output voltage Vout, sampling the output voltage and comparing the first derivative of the output voltage Vout with the predetermined threshold dth (i.e., comparing the difference of the output voltage Vout between the two subsequent time samples with the predetermined threshold voltage) may be kept in the digital domain, thereby simplifying an overall design of the controller 22 and of the flyback switching mode power supply 12. The processor in the pulse-width modulation unit 36 and the analogue to digital converter ADC may be part of a microcontroller.

Figure 4:
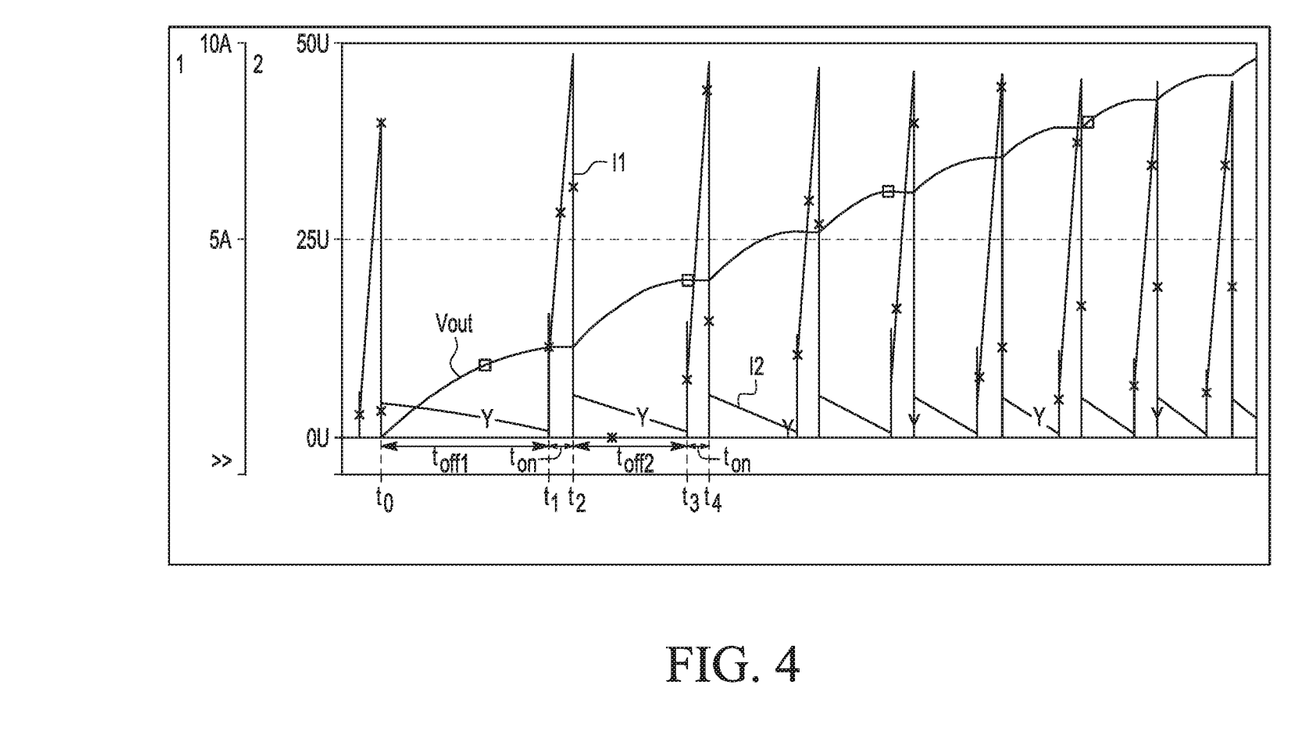

As already mentioned FIG. 4 shows a time diagram of the output voltage Vout across the capacitor C, the magnetizing current I1 flowing from the voltage source 15 into the primary winding L1 and demagnetizing current I2 flowing from the secondary winding L2 into the capacitor C of a flyback switching mode power supply according to any ones of the previously described embodiments according to the invention. FIG. 4 shows how the output voltage Vout may be built up across the capacitor C by using a cycle by cycle voltage control. The capacitor C is initially discharged and the output voltage Vout at time $t_0$ is initially zero. A fixed turn-on duration $t_{on}$ may be chosen for each cycle of the switch SW1 or the NMOS transistor M1. In this way a fixed amount of energy may be stored each time in the transformer T. During the off state of the switch SW1 or the NMOS transistor M1, the fixed amount of energy may be released thanks to the flyback action by the secondary winding L2 into the capacitor C via the demagnetizing current I2 flowing through the rectifying device RD or the diode D1. The duration of each off cycle ($t_{off1}$, $t_{off2}$, etc.) of the switch SW1 or the NMOS transistor may vary as it depends upon the output voltage Vout that has been built into the capacitor C during earlier cycles. Each time the output voltage Vout flattens out, i.e. the first derivative of the output voltage Vout becomes zero or smaller than the predetermined threshold dth, the switch SW1 or the NMOS transistor is turned on. The output voltage Vout may thus increase up to the predetermined target voltage Vtarget. Once the output voltage Vout has reached the predetermined target voltage Vtarget, the switch SW1 or the NMOS transistor M1 may be kept in off mode and the voltage control of the flyback switching mode power supply may be stopped.

Figure 5:
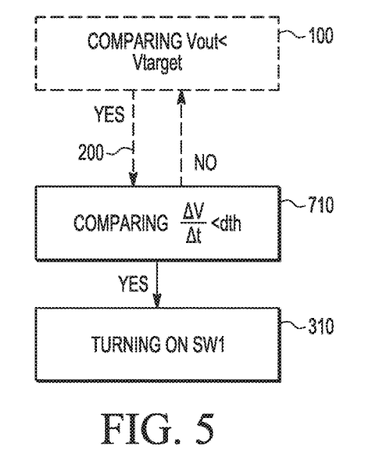

FIG. 5 show a flow chart of a method of controlling any of the flyback switching mode power supplies 10, 11 or 12 shown in the FIGS. 1 to 3. A controller 20, 21 or 22 of the type shown in FIGS. 1 to 3 may be used to perform the method indicated in FIG. 5. The method shown in the flow diagram of FIG. 5 compares 710 the first derivative of the output voltage Vout with a predetermined threshold dth and turns on 310 the switch SW1 if the first derivative of the output voltage Vout becomes smaller than the predetermined threshold dth. The method shown in FIG. 5 may additionally compare 100, before the comparing 710, the output voltage Vout with a predetermined target voltage Vtarget and only perform 200 the comparing 710 if the output voltage Vout is smaller than the predetermined target voltage Vtarget.

Figure 6:
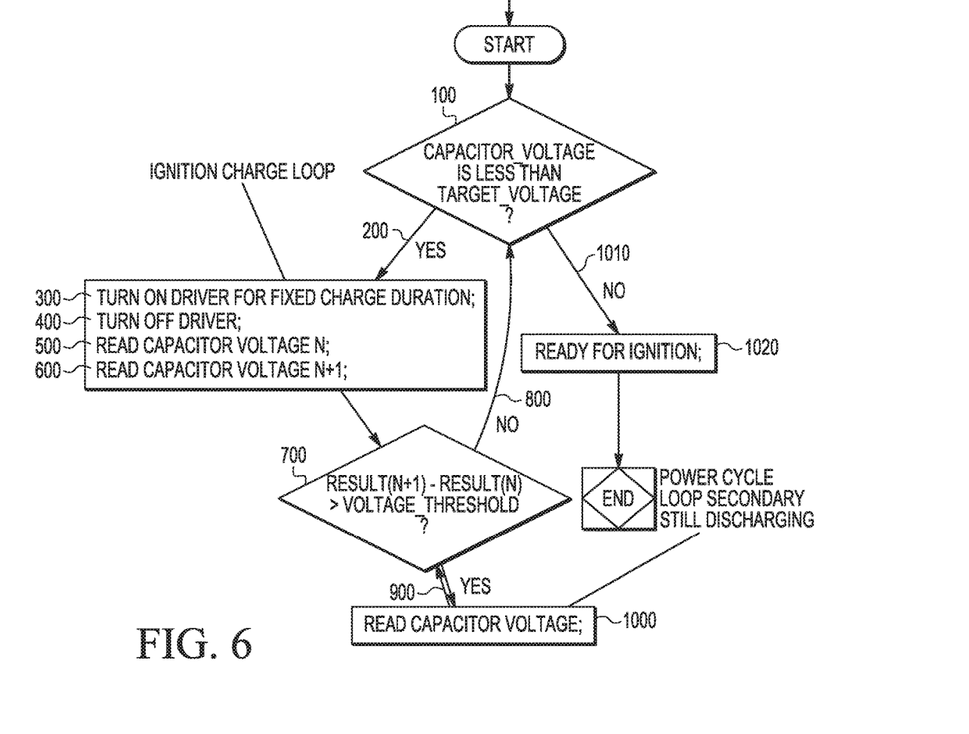

FIG. 6 shows a flow chart of the same method described in FIG. 5 wherein more optional actions than the actions performed by the method schematically drawn in FIG. 5 are included. The flow chart of FIG. 6 shows typical actions that may be performed by said method during a full charging control cycle of the capacitor C to the predetermined target voltage Vtarget. The method shown in FIG. 6 may include a start block at which the voltage control cycle may start, comparing 100 of the output voltage with the predetermined target voltage Vtarget. If the output voltage Vout is larger than the predetermined target voltage Vtarget (arrow line with referral number 1010), the controller may keep a driver (i.e. the switch SW1 or the NMOS transistor M1) of the flyback switching mode power supply in an off state and the flyback switching mode power supply may be ready for ignition 1020.

If the output voltage Vout is smaller than the predetermined target voltage Vtarget a sequence of actions may be performed: turning on 300 the driver for a fixed $t_{on}$ duration, turning off 400 the driver, reading 500 the output voltage Vout at time N, reading 600 the output voltage Vout at time N+1, comparing 700 a difference between the output voltage Vout at time N+1 and the output voltage Vout at time N with a predetermined threshold voltage; if said difference is larger than the predetermined threshold voltage, the output voltage Vout across the capacitor C may be read in the reading 1000 after which the method may enter in a loop called in FIG. 6 as "Pulse-Width Modulation cycle loop, secondary still discharging" until said difference is smaller than the predetermined threshold voltage. In other words the output voltage Vout may be continuously (or at discrete specified time samples as mentioned earlier) read at each time N at the reading 1000 and the difference between the output voltage Vout at time N+1 and the output voltage Vout at time N may be continuously compared with the predetermined threshold voltage until said difference is smaller than the predetermined threshold voltage. Once the difference between the output voltage Vout at time N+1 and the output voltage Vout at time N has become smaller than the predetermined threshold voltage, the "PWM cycle loop, secondary still discharging" may be stopped and the method may perform 800 again the comparison 100. Any of the reading voltages steps may be undertaken using known methods of noise reduction such as multiple analogue to digital converters reads and averaging.

It should be noted that the method of controlling the flyback switching mode power supply according to the embodiments of the invention shown in FIG. 6 may be an exemplary implementation of the method shown in FIG. 5. As explained earlier the output voltage Vout may be monitored at discrete time samples and the difference of the output voltage Vout at two closely spaced time samples may be taken and compared to the predetermined threshold voltage. This is equivalent to calculate the first derivative of the output voltage Vout over time and compare the first derivative with the predetermined threshold dth as shown in FIG. 5.

A computer program product may be used that includes instructions to cause any of the controllers 20, 21 or 22 described through the FIGS. 1 to 3 to perform the method explained through the FIGS. 5 and 6.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections between electrically coupled devices may be any type of connection suitable to transfer signals from or to the respective nodes, units or devices, for example via intermediate devices. Accordingly, unless implied or stated otherwise the connections may for example be direct connections or indirect connections. For example in FIG. 1 a dashed line is drawn between the controller 20 and the switch SW1 to indicate that there may be other components electrically coupling the controller 20 to the switch SW1.

Because the circuits implementing the present invention are, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention. For example the controller 20, 21, 22, the sensing device 30, the pulse-width modulation unit 35, 36 of FIGS. 1 to 3 may be implemented in many alternative ways known to those skilled in the art.

Although the invention has been described with respect to specific polarity of potentials, skilled artisans appreciated that polarities of potentials may be reversed. For example the magnetizing current I1 and the magnetizing current I2 as well as the input voltage Vin and the output voltage Vout may have an opposite polarity to the polarity shown in FIGS. 1 to 3.

It is to be understood that FIGS. 1 to 3 show some architectures of the present invention. The architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in the embodiments of FIGS. 1 to 3, the illustrated elements of the flyback switching mode power supply 10, 11 and 12 or some of the illustrated elements of the flyback switching mode power supply 10, 11 and 12 or external to the flyback switching mode power supply 10, 11 and 12 (e.g. the controller 20, 21 or 22) may be located on a single integrated circuit or within a same device. Alternatively, the illustrated elements of the flyback switching mode power supply 10, 11 and 12 or some of the illustrated elements of the flyback switching mode power supply 10, 11 and 12 or external to the flyback switching mode power supply 10, 11 and 12 such (e.g. the controller 20, 21 or 22) may include any number of separate integrated circuits or separate devices interconnected with each other.

In the claims, any reference signs placed between parentheses shall not be construed as limiting the claim. The word 'comprising' does not exclude the presence of other elements or steps then those listed in a claim. Furthermore, the terms "a" or "an", as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an". The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An integrated circuit comprising:
   a flyback switching mode power supply including
      an input terminal to receive an input voltage,
      an output terminal to provide power to a load coupled to the output terminal,
      a rectifying device connected to the output terminal,
      a capacitor connected to the output terminal,
      a series arrangement of a switch and a primary winding of a transformer, the series arrangement to receive the input voltage, and
      a secondary winding of the transformer to provide current to charge the capacitor via the rectifying device; and
   a controller to:
      monitor a voltage at the capacitor;
      calculate a first derivative of the voltage at the capacitor over time;
      compare the first derivative to a predetermined threshold; and
      turn on the switch in response to determining that the first derivative is less than the predetermined threshold.

2. The integrated circuit according to claim 1, further configured for turning on the switch for a fixed duration.

3. The integrated circuit as claimed in claim 1 further configured for keeping the switch in an off state when the voltage at the capacitor has reached a predetermined target voltage.

4. The integrated circuit as claimed in claim 3 further configured for connecting the load in parallel with the capacitor for discharging the capacitor into the load after the voltage at the capacitor has reached the predetermined target voltage.

5. The integrated circuit as claimed in claim 1, further comprising a sensing device to sense the voltage at the capacitor, and a pulse-width modulation unit for turning on and turning off the switch, the sensing device being configured for generating a feedback voltage proportional to the sensed voltage, the pulse-width modulation unit being arranged for receiving the feedback voltage to modulate a duration of the off state of the switch.

6. The integrated circuit as claimed in claim 5, wherein the sensing device is a resistor ladder electrically connected in parallel with the capacitor for scaling down the voltage at the capacitor into the feedback voltage.

7. The integrated circuit as claimed in claim 5, wherein the pulse-width modulation unit comprises an analogue to digital converter for converting the feedback voltage into a digital feedback value.

8. The integrated circuit as claimed in claim 1, wherein the switch of the switching mode power supply is a MOS transistor.

9. The integrated circuit as claimed in claim 1, wherein the predetermined threshold is less than 0.5 V per 10 us.

10. A capacitive discharge ignition system comprising the capacitor, and the controller as claimed in claim 1.

11. The capacitive discharge ignition system as claimed in claim 10, wherein the load in parallel with the capacitor comprises an ignition coil for receiving a charge from the capacitor during an ignition event.

12. The capacitive discharge ignition system as claimed in claim 11 comprising a battery for supplying power to the capacitive discharge ignition system.

13. A method of controlling a flyback switching mode power supply, the flyback switching mode power supply comprising:
   an input terminal to receive an input voltage,
   an output terminal to provide power to a load coupled to the output terminal,
   a rectifying device connected to the output terminal,
   a capacitor connected to the output terminal,
   a series arrangement of a switch and a primary winding of a transformer, the series arrangement being arranged for receiving the input voltage, and
   a secondary winding of the transformer to provide current for charging the capacitor via the rectifying device;
   the method comprising:
      monitoring a voltage at the capacitor;
      calculating a first derivative of the voltage at the capacitor over time;
      compare the first derivative to a predetermined threshold; and
      turning on the switch in response to determining that the first derivative is less than the predetermined threshold.

14. The method as claimed in claim 13, further comprising before the comparing:
   comparing the voltage at the capacitor with a predetermined target voltage; and performing the comparing of the change of the voltage at the capacitor over time with the predetermined threshold when the voltage at the capacitor is smaller than the predetermined target voltage.

15. The method according to claim 13, further comprising turning on the switch for a fixed duration.

16. The method as claimed in claim 13 further comprising keeping the switch in an off state when the voltage at the capacitor has reached a predetermined target voltage.

17. The method as claimed in claim 16 further comprising connecting the load in parallel with the capacitor for discharging the capacitor into the load after the voltage at the capacitor has reached the predetermined target voltage.

18. The method as claimed in claim 13, further comprising sensing the voltage at the capacitor, turning on and turning off the switch, generating a feedback voltage proportional to the sensed voltage, and receiving the feedback voltage to modulate a duration of the off state of the switch.

19. The method as claimed in claim 18, further comprising scaling down the voltage at the capacitor into the feedback voltage using a resistor ladder.

20. The method as claimed in claim 18, further comprising converting the feedback voltage into a digital feedback value.

* * * * *